United States Patent
She et al.

(10) Patent No.: US 7,860,184 B2
(45) Date of Patent: Dec. 28, 2010

(54) MULTI-ANTENNA COMMUNICATION METHOD AND MULTI-ANTENNA COMMUNICATON APPARATUS

(75) Inventors: Xiaoming She, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 731 days.

(21) Appl. No.: 11/813,650

(22) PCT Filed: Jan. 10, 2006

(86) PCT No.: PCT/JP2006/300147

§ 371 (c)(1),
(2), (4) Date: Jul. 10, 2007

(87) PCT Pub. No.: WO2006/075577

PCT Pub. Date: Jul. 20, 2006

(65) Prior Publication Data

US 2009/0010353 A1    Jan. 8, 2009

(30) Foreign Application Priority Data

Jan. 13, 2005    (CN) .................... 2005 1 0004364

(51) Int. Cl.
*H04B 7/02* (2006.01)
*H04L 1/02* (2006.01)
*H04L 27/00* (2006.01)
*H04L 5/12* (2006.01)
*H04K 1/10* (2006.01)

(52) U.S. Cl. .................. 375/267; 375/259; 375/260; 455/132; 455/504

(58) Field of Classification Search .......... 375/267, 375/259, 260
See application file for complete search history.

(56) References Cited

U.S. PATENT DOCUMENTS 7,292,825 B2 * 11/2007 Beale et al. .............. 455/67.11
2003/0002461 A1 * 1/2003 Chaponniere et al. ....... 370/335

(Continued)

OTHER PUBLICATIONS

PCT International Search Report dated Mar. 20, 2006.

(Continued)

*Primary Examiner*—David C Payne
*Assistant Examiner*—Erin M File
(74) *Attorney, Agent, or Firm*—Dickinson Wright PLLC

(57) ABSTRACT

A multi-antenna communication method capable of improving the retransmission performance in a multi-antenna transmission. In this method, firstly, the reception quality of a substream to be retransmitted is acquired (Step 401). Then, it is determined for the substream whether any transmission antennas, which satisfy a target value related to the foregoing reception quality when they are used for the retransmission, are existent among the transmission antennas that are candidate antennas to be used for there transmission (Step 405). Then, if there exist any transmission antennas satisfying the target value, a transmission antenna to which the poorest channel characteristic corresponds is selected from among those transmission antennas satisfying the target value, and the selected transmission antenna is designated as an antenna to be used for retransmitting the foregoing substream (Step 406). If there exist no transmission antennas that satisfy the target value, then a transmission antenna to which the best channel characteristic corresponds is selected from among the foregoing candidate transmission antennas, and the selected transmission antenna is designated as an antenna to be used for retransmitting the foregoing substream (Step 407).

8 Claims, 5 Drawing Sheets

U.S. PATENT DOCUMENTS

| | | | |
|---|---|---|---|
| 2003/0039227 A1* | 2/2003 | Kwak | 370/330 |
| 2003/0231582 A1* | 12/2003 | Logvinov et al. | 370/208 |
| 2004/0085934 A1* | 5/2004 | Balachandran et al. | 370/335 |
| 2005/0201327 A1* | 9/2005 | Kim et al. | 370/329 |
| 2007/0201503 A1* | 8/2007 | Nishio | 370/437 |
| 2008/0170533 A1* | 7/2008 | Cyzs et al. | 370/315 |
| 2008/0268844 A1* | 10/2008 | Ma et al. | 455/436 |

OTHER PUBLICATIONS

H. Zheng, et al.; "Multiple ARQ Processes for MIMO Systems," In: Parsonal, Indoor and Mobile Radio Communications 2002, Sep. 18, 2002, vol. 3, pp. 1023-1026.

L.M. Davis, et al.; "System Architecture and ASICs for a MIMO 3GPP-HSDPA Reciever," In: Vehicular Technology Conference 2003 Spring, Apr. 25, 2003, vol. 2, pp. 818-822.

\* cited by examiner ns 105 and $n_R$ receive antennas 106, respectively.

MULTI-ANTENNA COMMUNICATION METHOD AND MULTI-ANTENNA COMMUNICATON APPARATUS

TECHNICAL FIELD

The present invention relates to an automatic retransmission technology in a multi-antenna radio communication system. More particularly, the present invention relates to a multi-antenna communication method and a multi-antenna communication apparatus for performing retransmission using antenna selection in a multi-antenna communication system.

BACKGROUND ART

The growing information transmission rate is one of major problems which radio communication systems in the future will face. In order to realize this goal with limited spectrum resources, a multi-antenna technology (for example, MIMO: Multi-Input Multi-Output) is becoming one of indispensable means used in radio communication systems for now and future. In a MIMO system (or referred to as a "system"), the transmitting side transmits a signal using multiple antennas and the receiving side receives a signal in space using multiple antennas. According to researches, compared to a conventional single antenna transmission scheme, the MIMO technology can improve channel capacity significantly and improve information transmission rate.

FIG. 1 schematically shows the configuration of a conventional MIMO system.

In this configuration, the transmitting side and the receiving side transmit and receive a signal using $n_T$ transmit antennas 105 and $n_R$ receive antennas 106, respectively.

Data subjected to transmission on the transmitting side is outputted from data source 101 to S/P (serial/parallel conversion) section 102 first and divided into $n_T$ data substreams by S/P section 102. The divided $n_T$ data substreams correspond to $n_T$ transmit antennas 105 respectively.

Each data substream is subjected to CRC (Cyclic Redundancy Check) encoding by CRC encoding sections 103 before transmission. Here, CRC encoding refers to adding a CRC bit to the rear of each block of the data subjected to transmission. The CRC bit is used to verify a corresponding block on the receiving side. That is, when CRC decoding sections 108 on the receiving side performs CRC decoding, it is possible to determine whether or not errors occur in blocks.

Each data substreams after CRC encoding is subjected to channel encoding and modulation by channel encoding and modulating sections 104. Each data substreams after encoding and modulation is subjected to predetermined radio transmitting processing including, for example, digital-to-analog conversion and up-conversion and transmitted from corresponding transmit antennas 105.

On the receiving side, all signals in a space are received by $n_R$ receive antennas 106 first and the received signal is subjected to predetermined radio receiving processing including, for example, down-conversion and analog-to-digital conversion. When a pilot signal is added to data on the transmitting side, the pilot signal is extracted from the received signal. Furthermore, channel estimating section 110 performs channel estimation based on the pilot signal or using other schemes so that it is possible to obtain present channel characteristic matrix H (for a MIMO system, the channel characteristic can be represented by one matrix).

MIMO detecting/retransmission combining section 107 subjects the signal after radio receiving processing to MIMO detecting processing and combining processing. MIMO detecting processing uses channel characteristic matrix H and subjects signals received by receive antennas 106 to detecting processing. Furthermore, combining is performed on the signal version after the same signal retransmission. The signal finally obtained is outputted to CRC decoding sections 108.

Here, various methods can be used in detecting MIMO. For example, ZF (Zero Forcing), MMSE (Minimum Mean Square Error), SIC (Successive Interference Cancellation) or other methods are often used.

MIMO detection generally includes two operations. Namely, the operation of decomposing a received signal using a detection element and obtaining signals corresponding to data substreams transmitted from transmit antennas 105, and the operation of demodulating and decoding the signals. These two operations are not performed independently. That is, the output from the former is acquired by the latter, and the progress of the former often requires the output from the latter. Therefore, demodulation and decoding will be described included in MIMO detecting/retransmission combining section 107 for convenience.

The signal outputted to CRC decoding sections 108 corresponds to the data substreams after CRC encoding and before channel encoding and modulation.

CRC decoding sections 108 subject the signals outputted from MIMO detecting/retransmission combining section 107 to CRC decoding. Thus, it is possible to determine whether or not each present data substream is received correctly.

Furthermore, CRC decoding sections 108 generate a positive acknowledgement signal (ACK) or a negative acknowledgement signal (NACK) after every CRC decoding.

The generated ACK/NACK signal is fed back to the transmitting side through feedback channel 111. Here, an ACK signal refers to a signal where no code error occurs in a data block and a NACK signal refers to a signal where some code error occurs in a data block. When the transmitting side determines that a signal fed back from the receiving side to the transmitting side is an ACK signal, this means that the corresponding data substream is correctly received, and the transmitting side transmits a new data substream from corresponding transmit antennas 105 upon next transmission. Further, when the transmitting side determines that the signal fed back is a NACK signal, this means that the corresponding data substream after receiving processing contains some code error, and the transmitting side retransmits the original data substream from corresponding transmit antennas 105 upon next transmission.

When the CRC decoding result confirms that the data substream is received correctly without error, the CRC bit added to the rear of data by CRC encoding sections 103 on the transmission side is removed and the original data stream is obtained.

Data streams outputted from CRC decoding sections 108 are subjected to parallel-to-serial conversion by P/S conversion (parallel-to-serial) section 109, and finally received data is acquired and outputted.

As described above, MIMO detecting/retransmission combining section 107 carries out MIMO detecting and combining processing on received data after a plurality of transmissions of the same data stream. For example, after a certain data stream is transmitted N times (one of them is the first time transmission and N−1 are the number of times of retransmissions), N received signals are acquired. The received signals are represented as $r_1, r_2, \ldots r_n$. $r_1$ among them is a received signal after the first transmission and the rest are received signals after retransmissions. These received signals also normally different each other according to channel characteristics changes and differences in noise per transmission. The receiving side subjects these N received signals $r_1, r_2 \ldots r_n$ to combining processing and when correct substreams still are not acquired at this time, next retransmission is requested. Furthermore, after next retransmission signal is received on the receiving side, (N+1) received signals $r_1, r_2 \ldots r_n, r_{n+1}$ are subjected to combining processing. In the MIMO system, combining processing of a plurality of received signals generally includes two methods. (1) Performing detection and then combining. That is, received signals are individually subjected to MIMO detection and the detected signals are then combined. (2) Performing combining and then detection. That is, a received signal is subjected to combining first and the combined signal is then subjected to MIMO detection.

In a conventional MIMO system, when an error is found in a data substream transmitted from a certain transmit antenna and the substream data is retransmitted, generally no antenna selection is performed. When an error occurs in a substream of one of antennas the conventional MIMO system actually uses a method for retransmitting the substream through the antenna. In this way, antenna selection is not performed in every retransmission in the conventional MIMO system, and the following situation may occur. (1) Antenna characteristics upon retransmission are so poor that, even when the receiving side performs combining processing after this retransmission, a completely correct data stream cannot be acquired. Therefore, next retransmission needs to be performed, which affects the time delay characteristic of the system. (2) Antenna characteristics are so excellent upon retransmission that retransmission could actually may be realized even when a worse antenna is selected. However, no selection is made here and only a poor antenna is used for transmitting new data, it naturally causes degradation of the code error characteristic in the system.

MEANS FOR SOLVING THE PROBLEM

The present invention is disclosed for solving the above described problems. It is an object of the present invention to provide a multi-antenna communication method and a multi-antenna communication apparatus capable of further improving retransmission performance in multi-antenna transmission.

It is another object of the present invention to provide a multi-antenna communication method and a multi-antenna communication apparatus for adaptively selecting a transmit antenna having appropriate characteristics for each retransmission substream based on an SINR of a substream to be presently retransmitted and the channel characteristic upon retransmission. In antenna selection, an SINR value after present detecting and combining of each substream subjected to retransmission is calculated. Then, based on the calculated SINR value, a transmit antenna having an appropriate characteristic for each retransmission substream is selected and retransmission is performed. On one hand, data after retransmission through the selected antenna need to be correctly received, and, on the other hand, the transmission characteristics of other antennas should not be deteriorated due to exclusive use of too excellent transmit antennas.

A further object of the present invention is to provide a multi-antenna communication method and a multi-antenna communication apparatus capable of efficiently improving the spectrum efficiency characteristic of a system by optimizing a transmit antenna used for every retransmission.

Although in the MIMO system, it is not possible to determine in which bit of the substream the error occurred in the substream containing some errors after MIMO detection, it is possible to determine an SINR (Signal to Interference and Noise Ratio)-after-MIMO-detecting of each substream. Furthermore, it is possible to calculate a necessary SINR even when errors basically do not occur in the substream. It is possible to select a transmit antenna having an appropriate characteristic based on the numerical value of the SINR and perform retransmission. Thus, it is possible to solve the above conventional problems in the conventional MIMO system that is, the problems caused when the retransmit antenna characteristic is too excellent or too poor.

The multi-antenna communication method according to the present invention includes: acquiring reception quality of a substream requiring a retransmission; determining, with respect to the substream, whether or not there is a transmit antenna that will satisfy a target value of reception quality if used in the retransmission, among candidate transmit antennas for use in the retransmission; and if there are transmit antennas that will satisfy the target value, selecting a transmit antenna where corresponding channel characteristics are poorest from a transmit antenna that satisfies the target value and designating the selected transmit antenna as an antenna to be used in the retransmission of the substream, and, if there are no transmit antennas that will satisfy the target value, selecting a transmit antenna where corresponding channel characteristics are best as an antenna to be used in the retransmission of the substream from the candidate transmit antennas.

The multi-antenna communication method according to the present invention includes the above described configuration wherein: the acquiring step further comprises a step of respectively acquiring reception quality of a plurality of substreams requiring a retransmission and selecting each of the plurality of substreams in order from higher reception quality acquired; and the determining step comprises determining, with respect to selected substreams, whether or not there is a transmit antenna that will satisfy the target value.

The multi-antenna communication method according to the present invention includes the above described configuration further comprising a step of determining a substream requiring a retransmission based on a result of cyclic redundancy check decoding of all received substreams.

The multi-antenna communication method according to the present invention includes the above described configuration wherein the acquiring step comprises calculating reception quality after a multi-input multi-output detection for a substream among the plurality of substreams that is transmitted for the first time, and calculating reception quality upon previous reception for a substream among the plurality of substreams that is transmitted not for the first time.

The multi-antenna communication method according to the present invention includes the above described configuration further comprising an excluding step of, after one of the plurality of substreams is selected in the selecting step and before another one of the plurality of substreams is selected in the selecting step, excluding a transmit antenna selected for the one of the plurality of substreams, from the candidate transmit antennas.

The multi-antenna communication method according to the present invention includes the above described configuration further comprising a feeding back step of, after a transmit antenna is selected for each substream requiring a retransmission in the designating step, feedback an antenna selective information for associating each substream and a corresponding selected antenna.

The multi-antenna communication method according to the present invention includes the above described configuration further comprising a step of retransmitting each substream based on the antenna selective information and a step of detecting each retransmitted substream based on the antenna selective information.

The multi-antenna communication apparatus according to the present invention has a configuration including: a section that acquires reception quality of a substream requiring a retransmission; a section that determines, with respect to the substream, whether or not there is a transmit antenna that will satisfy a target value of reception quality if used in the retransmission, among candidate transmit antennas for use in the retransmission; and a section that, if there are transmit antennas that will satisfy the target value, selects a transmit antenna where corresponding channel characteristics are poorest from a transmit antenna that satisfies the target value and designating the selected transmit antenna as an antenna to be used in the retransmission of the substream, and, if there are no transmit antennas that will satisfy the target value, selects a transmit antenna where corresponding channel characteristics are best as an antenna to be used in the retransmission of the substream from the candidate transmit antennas.

The above objects, advantages and features of the present invention will be clarified with reference to detailed description of a preferred embodiment and to the attached drawings.

BEST MODE FOR CARRYING OUT THE INVENTION

Hereinafter, an embodiment of the present invention will be described more specifically with reference to the attached drawings.

Figure 1:
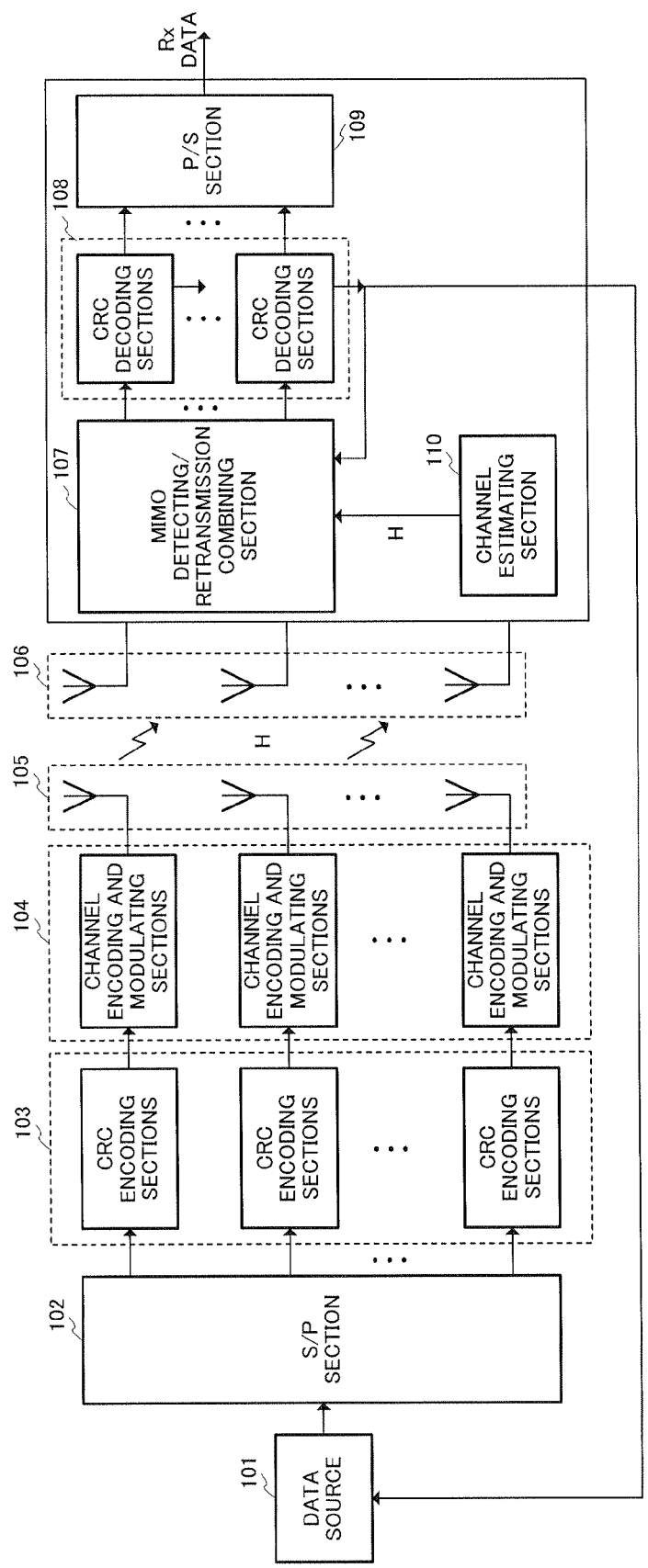
FIG. 1 is a schematic diagram showing the configuration of a conventional MIMO system.
Figure 2:
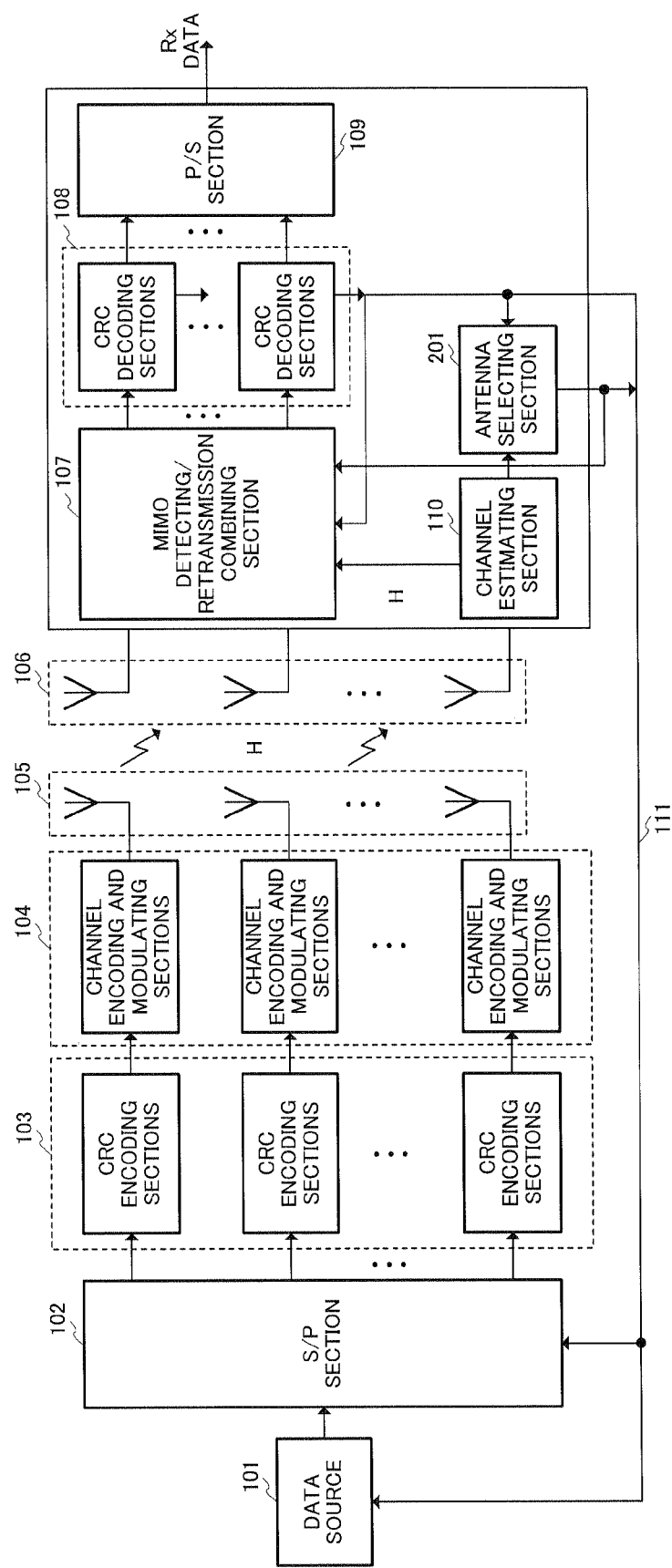
FIG. 2 is a schematic diagram showing the configuration of a MIMO system according to the embodiment of the present invention.

FIG. 2 schematically shows the configuration of a MIMO system according to the embodiment of the present invention. The MIMO system according to the present embodiment includes data source 101, S/P section 102, $n_T$ CRC encoding sections 103, $n_T$ channel encoding and modulating sections 104, $n_T$ transmit antennas 105, $n_R$ receive antennas 106, MIMO detecting/retransmission combining section 107, $n_R$ CRC decoding sections 108, P/S section 109, channel estimating section 110 and antenna selecting section 201. The transmitting apparatus includes data source 101, S/P section 102, CRC encoding sections 103, channel encoding and modulating sections 104 and transmit antennas 105, and the receiving apparatus includes receive antennas 106, MIMO detecting/retransmission combining section 107, CRC decoding sections 108, P/S section 109, channel estimating section 110 and antenna selecting section 201. Data source 101, S/P section 102, CRC encoding sections 103, channel encoding and modulating sections 104, transmit antennas 105, receive antennas 106, MIMO detecting/retransmission combining section 107, CRC decoding sections 108, P/S section 109 and channel estimating section 110 are the same as those explained using FIG. 1, and are assigned the same reference numerals as those in FIG. 1.

In this configuration, the transmitting side and the receiving side transmit and receive signals using $n_T$ transmit antennas 105 and $n_R$ receive antennas 106 respectively.

On the transmitting side, data subjected to transmission is outputted from data source 101 to S/P section 102 first, and divided into $n_T$ data substreams by S/P section 102. The divided $n_T$ data substreams correspond to $n_T$ transmit antennas 105 respectively.

Each data substream is subjected to CRC encoding processing in CRC encoding sections 103 and subjected to channel encoding and modulating processing in channel encoding and modulating section 104, sequentially, before transmission.

On the receiving side, all signals in space are received by $n_R$ receive antennas 106 first. Furthermore, channel estimating section 110 performs channel estimation based on pilot signals or using other schemes and obtains present channel characteristic matrix H.

A signal after radio receiving processing is subjected to MIMO detecting processing and combining processing by MIMO detecting/retransmission combining section 107. MIMO detecting processing uses channel characteristic matrix H and subjects signals received by receive antennas 106 to detecting processing. Furthermore, combining processing is performed on the received signal after retransmission of the same signal.

Each data substream outputted from MIMO detecting/retransmission combining section 107 is subjected to CRC decoding in CRC decoding sections 108. Thus, it is determined whether or not a code error occurs in each data substream subjected to reception combining processing, and an ACK or NACK signal is returned to the transmitting side correspondingly based on the result of CRC decoding and used in controlling the retransmission operation on the transmitting side.

Compared with the configuration of the conventional MIMO system in FIG. 1, the difference is that the MIMO system using the technology of the present invention provides antenna selecting section 201 on the receiving side.

Antenna selecting section 201 acquires channel characteristic matrix H estimated from channel estimating section 110. Furthermore, antenna selecting section 201 acquires a signal generated from CRC decoding sections 108.

Antenna selecting section 201 selects retransmit antenna set S'={S'$_{k1}$, S'$_{k2}$, ... } used upon next retransmission from transmit antennas 105 for the set of each substream requiring retransmissions after present reception processing, that is, for each substream in present retransmission substream set S={S$_{k1}$, S$_{k2}$, ... }. Here, the meaning of S' is as follows. That is, retransmission substream S$_{k1}$ uses transmit antenna S'$_{k1}$ upon next retransmission, substream S$_{k2}$ uses transmit antenna S'$_{k2}$ upon next retransmission, and the other substreams use transmit antennas in the same way.

Furthermore, antenna selecting section 201 acquires selected retransmit antenna set S' and feeds antenna set S' back to the transmitting side through feedback channel 111. Retransmit antenna set S' is fed back to the transmitting side through feedback channel 111 and is used to determine the output destination of the retransmission substream from S/P section 102.

To be more specific, upon next retransmission, data source 101 on the transmitting side extracts and outputs the data subjected to retransmitting from a memory buffer to S/P section 102 based on an ACK/NACK signal corresponding to each substream fed back from the receiving side. Furthermore, based on retransmit antenna set S' corresponding to each retransmit data substream fed back from the receiving side, S/P section 102 on the transmitting side assigns each retransmission substream to corresponding transmit antennas 105. Each retransmission substream after assignment is subjected to CRC encoding, channel encoding and modulation at corresponding CRC encoding sections 103 and channel encoding and modulating section 104, and transmitted from corresponding transmit antennas 105. New data transmitted for the first time can be freely assigned to transmit antennas 105 other than antennas shown in retransmit antenna set S'.

Antenna selecting section 201 transmits retransmit antenna set S' to MIMO detecting/retransmission combining section 107, too. MIMO detecting/retransmission combining section 107 uses retransmit antenna set S' for subjecting the retransmitted signals to reception combining.

As described above, the conventional MIMO system does not perform any operation of antenna selection when retransmitting substream data. The MIMO system according to the present embodiment optimizes and selects transmit antennas used for every retransmission by using the art of the present invention, so that it is possible to solve problems due to a retransmit antenna characteristic that is too excellent or too poor in the conventional system, and improve the performance of the overall system.

The other functions and operations related to data source 101, S/P section 102, CRC encoding sections 103, channel encoding and modulating sections 104, transmit antennas 105, receive antennas 106, MIMO detecting/retransmission combining section 107, CRC decoding sections 108, P/S section 109 and channel estimating section 110 are the same as those explained using FIG. 1, and are not described in detail.

Furthermore, according to the present embodiment, antenna selecting section 201 is provided on the receiving side. That is, the present embodiment implements the multi-antenna communication method and the multi-antenna communication apparatus of the present invention on the receiving apparatus. However, the multi-antenna communication method and the multi-antenna communication apparatus of the present invention may also be implemented on the transmitting apparatus by providing antenna selecting section 201 on the transmitting side and performing retransmit antenna selection processing at the transmitting side.

Figure 3:
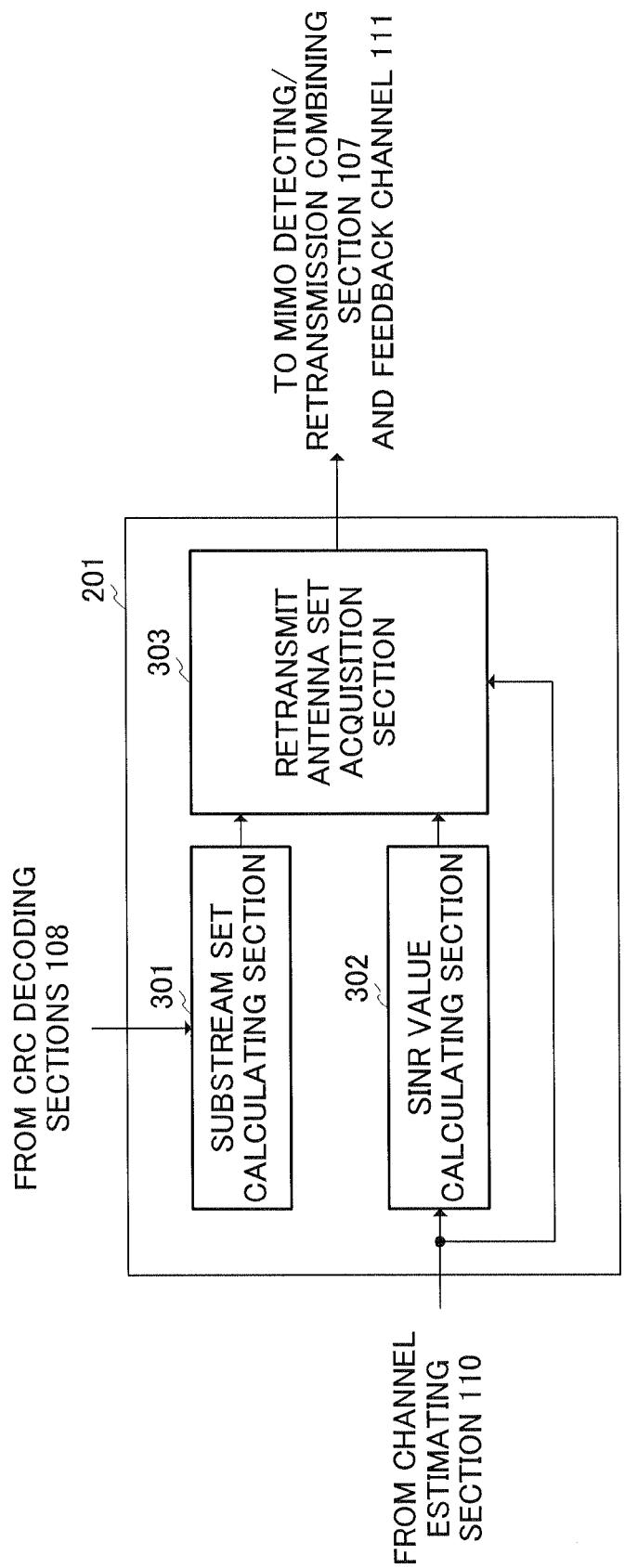
FIG. 3 is a block diagram showing the configuration of the retransmit antenna selecting section in the MIMO system according to the embodiment of the present invention.

Antenna selecting section 201 according to the present embodiment can be subdivided as shown in FIG. 3. FIG. 3 is a schematic diagram showing the configuration of antenna selecting section 201.

Antenna selecting section 201 has substream set calculating section 301, SINR value calculating section 302 and retransmit antenna set acquisition section 303.

First, substream set calculating section 301 acquires the present result of CRC decoding of each substream outputted by MIMO detecting/retransmission combining section 107 from CRC decoding sections 108, calculates the present retransmission substream set S (S={$S_{k1}$, $S_{k2}$, ...}) based on this result and outputs the result to retransmit antenna set acquisition section 303.

Next, SINR value calculating section 302 acquires channel characteristic matrix H estimated from channel estimating section 110, calculates the SINR value after present MIMO detection and retransmission combining of each substream in retransmission substream set S, acquires an SINR value set $S_{SINR}$={$SINR_{k1}$, $SINR_{k2}$, ...} based on channel characteristic matrix H and outputs the acquired result to retransmit antenna set acquisition section 303.

Finally, retransmit antenna set acquisition section 303 acquires retransmission substream set S calculated by substream set calculating section 301, SINR value set $S_{SINR}$ calculated by SINR value calculating section 302 and channel characteristic matrix H estimated by channel estimating section 110, selects transmit antennas used upon next retransmission of each substream in retransmission substream set S based on retransmission substream set S, SINR value set $S_{SINR}$ and channel characteristic matrix H, obtains and outputs retransmit antenna set S'={$S'_{k1}$, $S'_{k2}$, ...} to MIMO detecting/retransmission combining section 107 and feeds retransmit antenna set S'={$S'_{k1}$, $S'_{k2}$, ...} back to the transmitting side through feedback channel 111. In retransmit antenna set S', retransmission substream $S_{k1}$ uses transmit antenna $S'_{k1}$ upon next retransmission, retransmission substream $S_{k2}$ uses transmit antenna $S'_{k2}$ upon next retransmission, and transmit antennas used for other retransmission substreams can be estimated, too.

Figure 4:
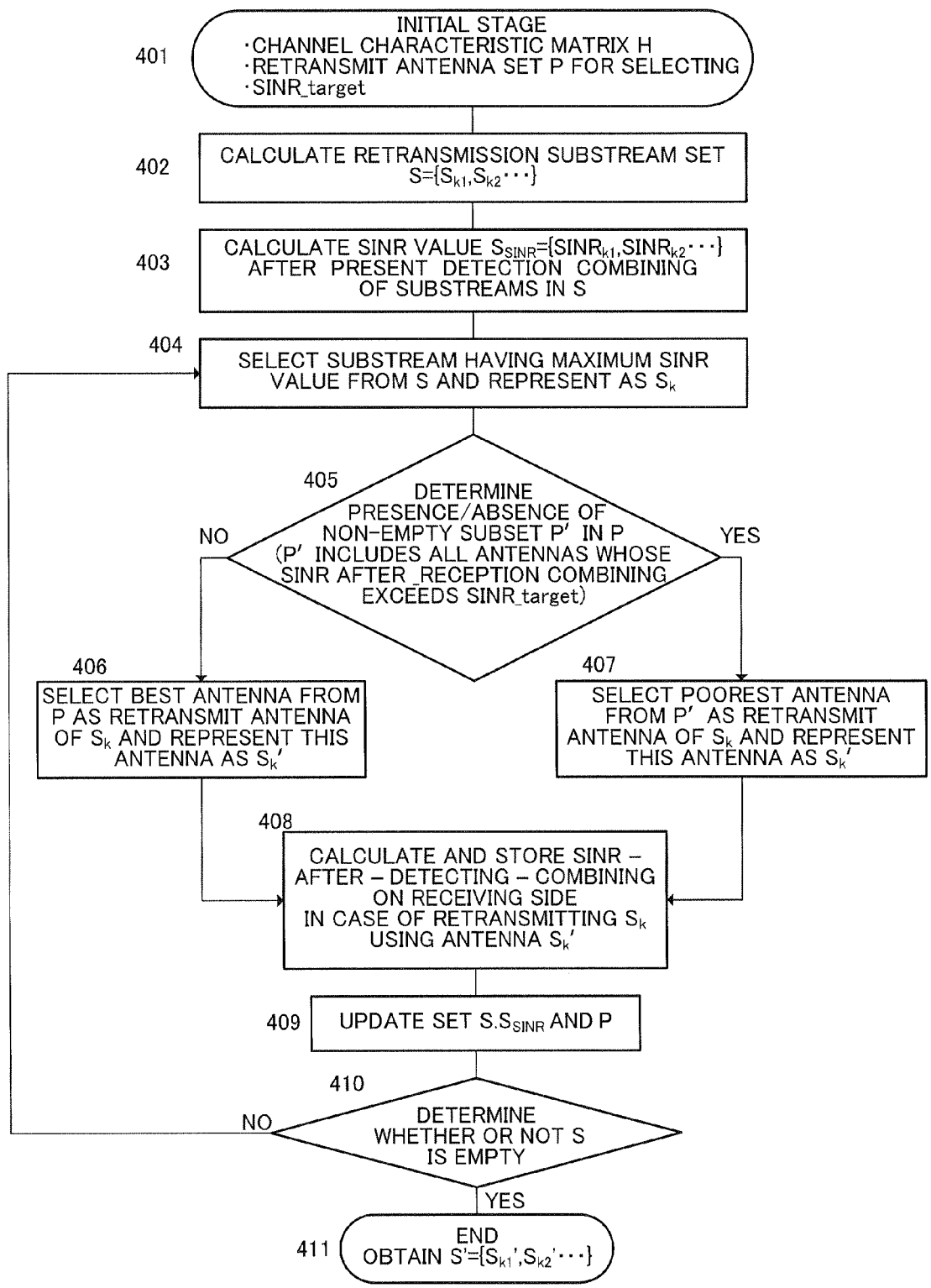
FIG. 4 is a flow chart showing antenna selecting processing in the method for performing retransmission using antenna selection according to the embodiment of the present invention.

The antenna selection technology used for MIMO retransmission adopted in the present invention can be explained using FIG. 4. FIG. 4 is a flow chart showing antenna selecting processing in the method of performing retransmission using antenna selection according to the present embodiment.

To be more specific, to implement the method, three steps are required.

Initial stage: An initial step is shown in step 401. The transmitting side of the MIMO system includes $n_T$ transmit antennas 105 and the receiving side includes $n_R$ receive antennas 106. Furthermore, each data substream transmitted by transmit antennas 105 is represented as S={$S_1$, $S_2$, ..., $S_{nT}$}. When channel characteristic matrix H of MIMO is known on the receiving side, channel characteristic matrix H can be acquired using a normal MIMO channel estimating method. Furthermore, a retransmit antenna set for selection use is expressed as P. In the initial stage, all transmit antennas 105 can be used in transmitting retransmission substreams, that is, P={1, 2, ..., $n_T$}.

Moreover, one important parameter must be determined here. The important parameter is target reception quality, for example, the target SINR, and represented as SINR_target. SINR_target indicates a desired SINR value which can be reached after data retransmission combining and is one important reference value in the antenna selecting process. Although an SINR is used as an index indicating the target reception quality in the present embodiment, another appropriate index may also be used alternately or additionally.

SINR_target can be selected as follows. That is, based on a certain target bit error rate (BER), an SNR (Signal to Noise Ratio) threshold is taken as SINR_target when the coding and modulated parameter is in a white Gaussian noise (AWGN) environment. For example, when the coding and modulation parameter used in the system is ½ turbo coding and QPSK modulation and a target BER is $10^{-4}$ for ½ turbo coding and QPSK modulation, the SNR threshold of AWGN is approximately 2.2 dB. Therefore, SINR_target in this case is determined as 2.2 dB.

The first step includes step 402 and step 403 shown in FIG. 4. In the first step, present retransmission substream set S={$S_{k1}$, $S_{k2}$, ...} is calculated (step 402), an SINR value after present detecting and combining of each substream in retransmission substream set S is calculated and $S_{SINR}$={$SINR_{k1}$, $SINR_{k2}$, ...} is acquired (step 403).

In step 402, substream set calculating section 301 can easily determine present retransmission substream set S based on the CRC decoding result of each substream. That is, present retransmission substream set S is a set of substreams corresponding to a NACK signal returned through CRC decoding sections 108.

For example, two cases are provided for calculating SINR value set $S_{SINR}=\{SINR_{k1}, SINR_{k2}, \ldots\}$ in step 403 as shown below. (1) A substream is transmitted for the first time. That is, MIMO detecting/retransmission combining section 107 subjects the substream only to MIMO detection and does not perform retransmission combining. At this time, $SINR_k$ corresponding to substream $S_k$ indicates a numerical value of the SINR subjected only to MIMO detection. The numerical value of the SINR can be easily calculated based on channel characteristic matrix H of present MIMO and the MIMO detection method used. (2) A substream is not transmitted for the first time. That is, MIMO detecting/retransmission combining section 107 performs MIMO detection and retransmission combining. At this time, the present SINR value of the substream after detecting and combining can be acquired in step 408 in the antenna selecting operation of previous reception. In step 408 upon previous reception, the numerical value of the SINR is already calculated and is stored.

Second step: the second step includes steps 404 to 410 executed by retransmit antenna set acquisition section 303. In the second step, a transmit antenna for each substream in retransmission substream set S is selected based on SINR value set $S_{SINR}$ and channel characteristic matrix H. That is, retransmit antenna set $S'=\{S'_{k1}, S'_{k2}, \ldots\}$ is acquired.

The second step includes substeps formed with following steps (1) to (5).

(1) This substep includes step 404 shown in FIG. 4. In step 404, a substream which maximizes the SINR value after present detecting and combining is selected from retransmission substream set S and represented as $S_k$. That is, it is k=arg max$\{SINR_{k1}, SINR_{k2}, \ldots\}$.

(2) This substep includes steps 405 to 407 shown in FIG. 4. In step 405, it is determined whether or not non-empty subset P' is provided in selective retransmit antenna set P. This subset P' includes all antennas whose SINR value-after-reception-combining exceeds the SINR_target when substream $S_k$ is retransmitted using an antenna.

When non-empty subset P' is not provided in selective retransmit antenna set P, an antenna having the best channel characteristic of the corresponding spatial channel is selected from selective retransmit antenna set P in step 406. The selected antenna is specified as the retransmit antenna for substream $S_k$ and is represented as $S_k'$.

When selective retransmit antenna P includes non-empty subset P', an antenna having the poorest channel characteristic of the corresponding spatial channel is selected from subset P' in step 407. The selected antenna is specified as the retransmit antenna for substream $S_k$ and is represented as $S_k'$.

The main operation of substep (2) is to determine subset P'. Actually, SINR value $\{SINR_{p1}', SINR_{p2}', \ldots\}$ after-reception-combining of the signal obtained when retransmitting substream $S_k$ using antennas in selective retransmit antenna set P is easily calculated and acquired in comparison with SINR_target. $SINR_{pj}'$ indicates an SINR value-after-retransmission-combining using $p_j$-th transmit antenna by substream $S_k$. Where combining is performed after detection, $SINR_{pj}'=4\times(SINR_k+SINR_{pj}'')/(SINR_k\times SINR_{pj}'')$ holds and where detection is performed after combining, $SINR_{pj}' \approx SINR_k+SINR_{pj}''$ holds. $SINR_{pj}''$ indicates an SINR value after only detection (without combining) after retransmission at the $P_j$-th transmit antenna and the SINR value is easily acquired based on channel characteristic matrix H of MIMO upon retransmission.

(3) This substep includes step 408 shown in FIG. 4. In step 408, when substream $S_k$ is retransmitted using antenna $S_k'$, an SINR value-after-detecting-and-combining on the receiving side at the present time is calculated and stored.

In previous substep (2), the SINR value $\{SINR_{p1}', SINR_{p2}', \ldots\}$ after-reception-combining of the signal acquired when actually retransmitting substream $S_k$ using the antennas is calculated. Here, only the SINR value corresponding to the finally determined transmit antenna $S_k'$ may be extracted from among the SINR value. The SINR value is stored and used in step 403 in the first step in the antenna selecting operation upon next reception.

(4) This substep includes step 409 shown in FIG. 4. In step 409, each set S, $S_{SINR}$ and P are updated. That is, substream $S_k$ is removed from retransmission substream set S, $SINR_k$ is removed from SINR value set $S_{SINR}$ and retransmit antenna $S_k'$ selected from selective retransmit antenna set P in substep (2) is removed.

(5) This substep includes step 410 shown in FIG. 4. In step 410, it is determined whether or not retransmission substream set S is already empty. The flow returns to step 404 when retransmission substream set S is not empty and moves to step 411 when the retransmission substream is empty.

Third step: the third step includes step 411 executed by retransmit antenna set acquisition section 303. In step 411, retransmit antenna set $S'=\{S'_{k1}, S'_{k2}, \ldots\}$ used for next retransmission of retransmission substream $\{S_{k1}, S_{k2}, \ldots\}$ is acquired and antenna selecting processing at the present time ends. Here, retransmission substream $S_{k1}$ uses transmit antenna $S'_{k1}$ upon next retransmission, substream $S_{k2}$ uses transmit antenna $S'_{k2}$ upon next retransmission and, transmit antennas used for the other substreams are estimated in the same way. Next, retransmit antenna set S' is transmitted to the transmitting side through feedback channel 111 as antenna selective information.

Furthermore, upon next retransmission, the transmitting side extracts data subjected to retransmission from the memory buffer first based on the ACK/NACK signal corresponding to each substream returned from the receiving side, allocates each retransmission substream to the corresponding transmit antenna based on the retransmit antenna set S' corresponding to each retransmit data substream returned from the receiving side and transmits each retransmission substream. It is possible to allocate new data at first transmission freely to antennas other than retransmit antenna set S'. Furthermore, retransmit antenna set S' is outputted to MIMO detecting/retransmission combining section 107 and is used for reception combining of the signal upon next transmission.

Antenna selecting processing shown in FIG. 4 selects the substreams in order from the highest SINR. However, the selection order may be set in various ways depending on conditions and requirements in the system.

Figure 5:
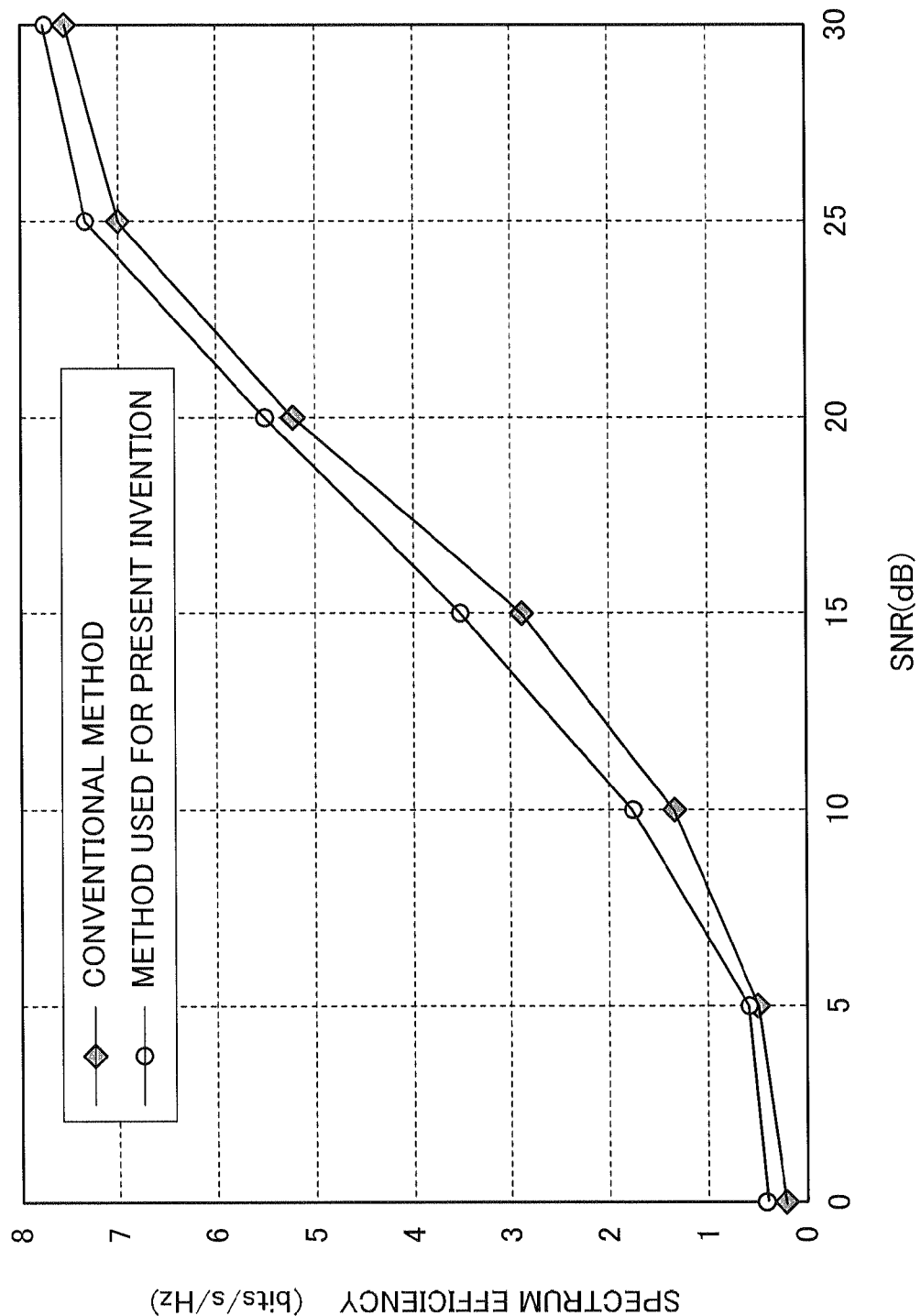
FIG. 5 is schematic diagram showing comparison of characteristics between the method used in the present invention and the conventional method.

FIG. 5 is a schematic diagram showing a comparison of the spectrum efficiency characteristic between the method used in the present invention and the conventional method.

Both the number of transmit antennas 105 and the number of receive antennas 106 used for a simulation are 4. The channel adopts a flat fading channel and QPSK modulation. In simulation, 1000 codes are included in one data frame and the target BER is $10^{-3}$. As shown in the result of FIG. 5, compared to the conventional method, by using the method of the present invention, it is possible to obtain a better spectrum efficiency characteristic.

Although the present invention has already been described with the preferred embodiment, it is obvious for those skilled in the art that the present invention may be modified, replaced or changed in various ways without departing from the spirit and scope of the present invention. Therefore, the present invention is not limited to the above embodiment and is limited by the attached claims or the equivalent thereof.

The present application is based on Chinese Patent Application No. 200510004364.8, filed on Jan. 13, 2005, entire content of which is expressly incorporated by reference herein.

The invention claimed is:

1. A multi-antenna communication method comprising:
calculating reception quality of a substream requiring a retransmission;
determining whether or not there is a transmission antenna that will satisfy a target reception quality if used in the retransmission of the substream, from among candidate transmission antennas for use in the retransmission of the substream; and
if there are transmission antennas that will satisfy the target reception quality from among the candidate transmission antennas for use in the retransmission of the substream, selecting a transmission antenna showing poorest channel characteristics from among the transmission antennas that will satisfy the target reception quality and designating the selected transmission antenna as an antenna to be used in the retransmission of the substream, and, if there are no transmission antennas that will satisfy the target reception quality from among the candidate transmission antennas for use in the retransmission of the substream, selecting a transmission antenna showing best channel characteristics from among the candidate transmission antennas for use in the retransmission of the substream as the antenna to be used in the retransmission of the substream.

2. The multi-antenna communication method according to claim 1, further comprising:
calculating reception quality of a plurality of the substreams requiring the retransmission and selecting substreams to retransmit in an order from a substream of highest reception quality to a substream of lowest reception quality, from the plurality of substreams; and
determining, for each substream that is selected, whether or not there is a transmission antenna that will satisfy the target reception quality if used in the retransmission of each selected substream.

3. The multi-antenna communication method according to claim 2, further comprising determining a substream from among the plurality of substreams requiring the retransmission based on a result of cyclic redundancy check decoding of all received substreams.

4. The multi-antenna communication method according to claim 2, further comprising, upon calculating the reception quality of the plurality of substreams requiring the retransmission, calculating reception quality after a multi-input multi-output detection for a substream that is transmitted for the first time, and calculating reception quality upon previous reception for another substream that is not transmitted not for the first time.

5. The multi-antenna communication method according to claim 2, further comprising, after one of the plurality of substreams is selected and before another one of the plurality of substreams is selected, excluding a transmission antenna used in a retransmission of the former one of the plurality of substreams, from the candidate transmission antennas for use in a retransmission of the latter one of the plurality of substreams.

6. The multi-antenna communication method according to claim 2, further comprising after a transmission antenna is selected for each substream requiring the retransmission, providing antenna selective information for associating each substream and an antenna selected for each substream.

7. The multi-antenna communication method according to claim 6, further comprising retransmitting each substream based on the antenna selective information, and detecting each retransmitted substream based on the antenna selective information.

8. A multi-antenna communication apparatus comprising:
a section that calculates reception quality of a substream requiring a retransmission;
a section that determines whether or not there is a transmission antenna that will satisfy a target reception quality if used in the retransmission of the substream, from among candidate transmission antennas for use in the retransmission of the substream; and
a section that, if there are transmission antennas that will satisfy the target reception quality from among the candidate transmission antennas for use in the retransmission of the substream, selects a transmission antenna showing poorest channel characteristics from among the transmission antennas that will satisfy the target reception quality, and designating the selected transmission antenna as an antenna to be used in the retransmission of the substream, and, if there are no transmission antennas that will satisfy the target reception quality from among the candidate transmission antennas for use in the retransmission of the substream, selects a transmission antenna showing best channel characteristics from among the candidate transmission antennas for use in the retransmission of the substream, as the antenna to be used in the retransmission of the substream.

* * * * *